(12) United States Patent
Kwatra et al.

(10) Patent No.: US 12,189,675 B2
(45) Date of Patent: Jan. 7, 2025

(54) METHODS AND SYSTEMS FOR MANAGING CONTENT STORAGE

(71) Applicant: INTERNATIONAL BUSINESS MACHINES CORPORATION, Armonk, NY (US)

(72) Inventors: Shikhar Kwatra, Durham, NC (US); Martin Keen, Cary, NC (US); Hernan Cunico, Holly Springs, NC (US); Richard Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/193,654

(22) Filed: Nov. 16, 2018

(65) Prior Publication Data
US 2020/0159835 A1 May 21, 2020

(51) Int. Cl.
*G06F 16/41* (2019.01)
*G06F 16/13* (2019.01)
*G06F 16/28* (2019.01)

(52) U.S. Cl.
CPC .............. *G06F 16/41* (2019.01); *G06F 16/13* (2019.01); *G06F 16/285* (2019.01)

(58) Field of Classification Search
CPC ........ G06F 16/41; G06F 16/13; G06F 16/285; G06F 16/7837; G06F 16/483; G06F 16/5854; G06F 16/45
See application file for complete search history.

(56) References Cited

U.S. PATENT DOCUMENTS

| | | | |
|---|---|---|---|
| 6,573,907 B1* | 6/2003 | Madrane | G06F 16/786 715/721 |
| 9,659,014 B1* | 5/2017 | Walters | G06F 16/7847 |
| 2004/0109197 A1 | 6/2004 | Gardaz | |
| 2010/0205541 A1* | 8/2010 | Rapaport | G06F 16/285 715/753 |
| 2011/0125809 A1* | 5/2011 | Woods | G06F 16/116 707/809 |
| 2011/0225066 A1* | 9/2011 | Carter | G06F 16/4393 705/27.1 |
| 2013/0036135 A1* | 2/2013 | Brockey | G06F 16/51 707/E17.01 |
| 2015/0112771 A1* | 4/2015 | Read | G06Q 10/0639 705/7.38 |
| 2016/0226972 A1* | 8/2016 | Mahankali | G06F 3/0631 |
| 2017/0187811 A1* | 6/2017 | Thomée | H04L 65/61 |
| 2018/0081649 A1 | 3/2018 | Chan et al. | |
| 2018/0196880 A1* | 7/2018 | Carter | G06F 16/9537 |

* cited by examiner

*Primary Examiner* — Albert M Phillips, III
*Assistant Examiner* — Fernando M Mari Valcarcel
(74) *Attorney, Agent, or Firm* — Yee & Associates, P.C.

(57) ABSTRACT

Embodiments for managing content by one or more processors are described. A content portion associated with a user is detected. A storage scheme for the content portion is selected based on at least one data source associated with utilization of previous content portions by the user. The content portion is caused to be stored on a computing device according to the selected storage scheme.

21 Claims, 9 Drawing Sheets

METHODS AND SYSTEMS FOR MANAGING CONTENT STORAGE

BACKGROUND OF THE INVENTION

Field of the Invention

The present invention relates in general to computing systems, and more particularly, to various embodiments for managing the storage of content.

Description of the Related Art

In recent years, computing devices, such as mobile electronic devices (e.g., cellular/mobile/smart phones, personal digital assistants (PDAs), and tablets, etc.), have become widely used to the point that many people now have such a device with them at all times. These devices are able to assist users in a multitude of ways in their daily lives, such as internet access, scheduling, entertainment, and particularly communication.

Additionally, computing devices may be used to capture and/or render various types of content, such as images, videos, and audio files. The content is often stored on more than one computing device. For example, the content may be stored on the device used to capture it, and it may also be "backed up" on a second device (e.g., a remote or cloud database). Typically, the backup copies of the content are stored as "full size" versions (e.g., at full resolution, at the originally recorded bit rate, etc.), as storage capacity is generally not a concern. However, this is often not the case for the device (e.g., a mobile phone) used to capture the content. As such, in order to minimize the storage spaced utilized, an "optimized" (e.g., smaller, lower resolution, etc.) version of the content may be stored on the local memory (e.g., within the device used to capture the content). This optimization of storage space is typically performed in a "binary" manner, without taking into account the way(s) in which the content will be rendered or utilized.

SUMMARY OF THE INVENTION

Various embodiments for managing content by one or more processors are described. In one embodiment, by way of example only, a method for managing content, again by one or more processors, is provided. A content portion associated with a user is detected. A storage scheme for the content portion is selected based on at least one data source associated with utilization of previous content portions by the user. The content portion is caused to be stored on a computing device according to the selected storage scheme.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
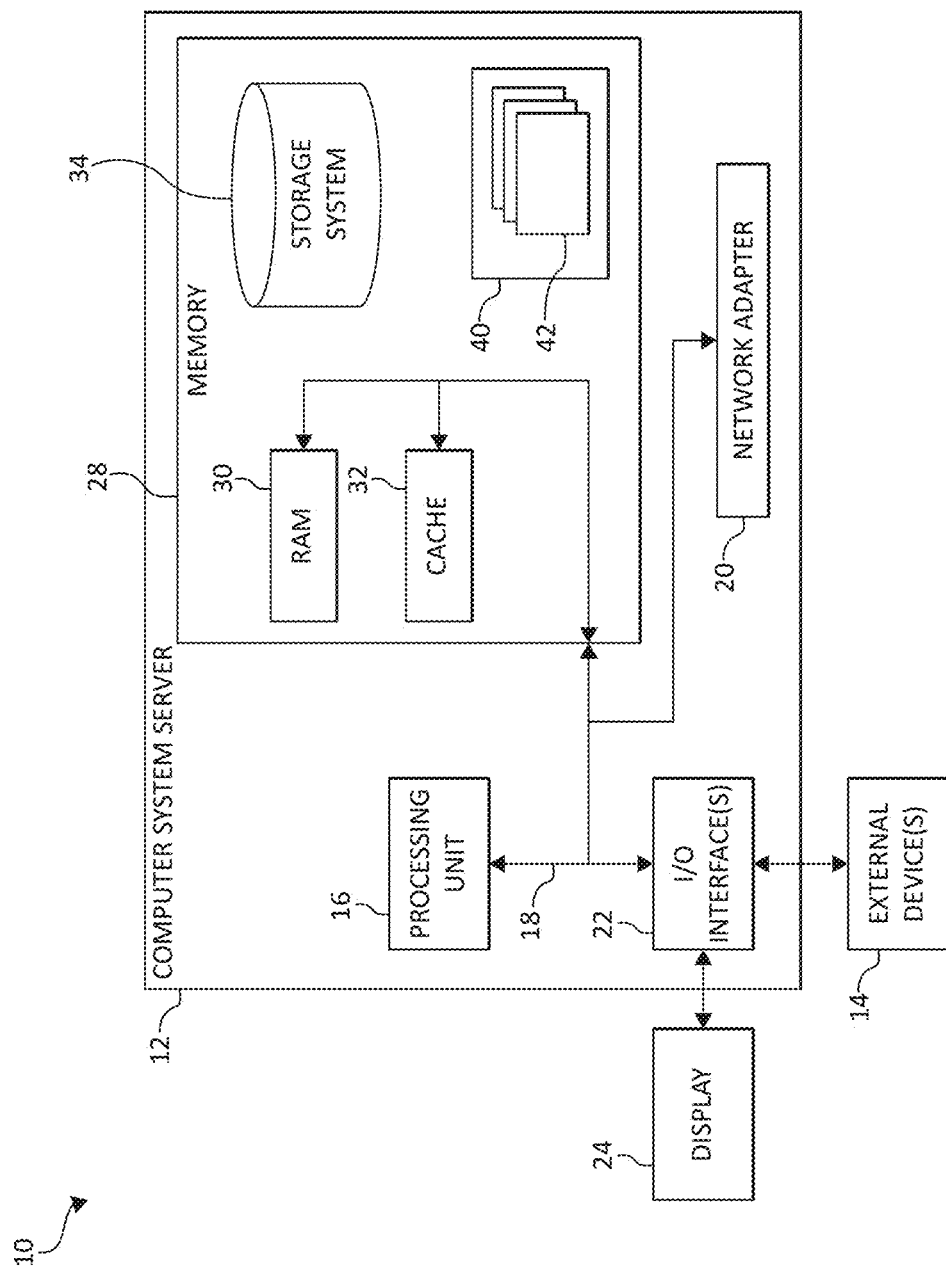
FIG. 1 is a block diagram depicting an exemplary computing node according to an embodiment of the present invention.

As discussed above, in recent years, computing devices, such as mobile electronic devices (e.g., cellular/mobile/smart phones, personal digital assistants (PDAs), and tablets, etc.), have become widely used to the point that many people now have such a device with them at all times. These devices are able to assist users in a multitude of ways in their daily lives, such as internet access, scheduling, entertainment, and particularly communication.

Additionally, computing devices may be used to capture and/or render various types of content, such as images, videos, and audio files. The content is often stored on more than one computing device. For example, the content may be stored on the device used to capture it, and it may also be "backed up" on a second device (e.g., a remote or cloud database). Typically, the backup copies of the content are stored as "full size" versions (e.g., at full resolution, at the originally recorded bit rate, etc.), as storage capacity is generally not a concern.

However, this is often not the case for the device (e.g., a mobile phone) used to capture the content. As such, in order to minimize the storage spaced utilized, an "optimized" (e.g., smaller, lower resolution, etc.) version of the content may be stored on the local memory (e.g., within the device used to capture the content).

This optimization of storage space is typically performed in a "binary" manner, without taking into account the way(s) in which the content will be rendered or utilized. More specifically, in some cases, the manner in which the content is stored (e.g., a full size version or a reduced size version) is based on a selection made by the user (e.g., through the device settings/preferences). However, in some instances, the manner in which the content is stored on the local device may not be optimized, particularly if the user will later render the content on (or with) another computing device or node.

For example, consider a scenario in which a user takes a "high" resolution photograph with the camera on their mobile phone and/or otherwise has such a photograph (or image) stored on their mobile phone (e.g., downloaded from an online source). If the user sends the photograph to another computing device, such as a tablet device, that has a screen resolution that is lower than the full resolution of the photograph, the storage of the photograph on the mobile phone may be considered to be less than optimal or ideal. More specifically, because the tablet device is not able to render the photograph at full resolution, storing a full size/resolution copy of the photograph on the mobile phone at least arguably utilizes more memory than is "necessary" (i.e., assuming the only way the user will utilize the photograph is by rendering it on the tablet device).

In contrast, if the user sends the photograph from their mobile phone to a high resolution television (e.g., a smart television) to be rendered/for viewing, storing a full size copy of the photograph on the mobile may be considered more ideal. That is, assuming the television is capable of rendering the photograph at full resolution, having a full size copy of the photograph stored on the mobile phone may be considered a suitable use of the mobile phone's memory.

In other words, in some instances, the "optimal" manner in which to store the content on the local device may be dependent on how the user will utilize the content. More specifically, the optimal storage scheme may vary depending on whether or not the content will be shared to (and/or rendered by) other computing devices and information related to those devices (e.g., the performance specifications of the other device(s)).

To address these needs, some embodiments described herein provide methods and systems for managing content based on, for example, an understanding (e.g., via a cognitive analysis) of how the user typically utilizes different types of content and/or the various computing devices the user typically utilizes with respect to the content.

More specifically, in some embodiments, the methods and/or systems described herein learn (e.g., over time) how a user shares and utilizes media (or content) captured with (or stored on) a computing device (e.g., a mobile device), based upon a cognitive classification of the media. The usage (or utilization) for a particular piece of content (or content portion) is predicted based on the content classification(s) and observed behavior of the user. An optimized version (or copy) of the content is stored based on this prediction.

In some embodiments, systems (and/or methods) are provided which combine cognitive classification of media (e.g., images, videos, audio files, etc.) captured with (and/or otherwise stored on) a first (or primary) computing device with their usage both on the first computing device and through, for example, sharing of that media to other (secondary) computing devices. Insights (and/or correlations) and predictions as to the expected usage and sharing pattern of the media may be generated. The local storage (or storage scheme) of the media (i.e., on the primary computing device) may be optimized based upon the predicted usage and sharing of the media.

In some embodiments, when content (or a content portion or media) is detected (e.g., received or captured by a computing device), the system performs a classification process on the content portion and/or otherwise analyzes it to determine various aspects of it and/or determined its "type." This classification may be utilized by the system to determine (or select) a storage scheme for the content portion on a primary computing device (e.g., the device that initially receives or captures the content portion). The storage scheme may be associated with or related to the amount of memory that is utilized to store the content portion (e.g., on the first computing device). For example, the storage scheme may include storing the content portion at a particular resolution, crop factor, frame rate, bit rate, or dynamic range, depending on the type of content (e.g., image, video, audio file, etc.).

In some embodiments, the selecting of the storage scheme may (also) be based on, for example, a user's (e.g., a user associated with the primary computing device) utilization of previous content portions (e.g., those similar to the received/detected content portion) and various information related to secondary computing devices (e.g., other computing devices utilized to render previous content portions). For example, the system may monitor the viewing of (or rendering by), and/or sharing/streaming of the content to, other computing devices and take into consideration various technical details or specifications of the other computing devices, such as display resolution, processor speed, available memory, etc. The system may derive or determine correlations between content classifications and the utilization of the content classifications (and/or details related to the respective computing devices). The correlations may be utilized by the system to select the storage scheme for the (newly) detected (or received) content portion(s).

As one particular example, the user's previous behavior may indicate that they typically render photographs (or at least particular types of photographs) captured with their mobile phone on a tablet device (e.g., the user sends/shares the photographs to the tablet device to render/view the photographs). The technical details and/or performance specifications of the tablet device may indicate that the display screen of the tablet device has a particular resolution. This information may be utilized by the system to determine the optimal manner (or "size") to store such photographs on the user's mobile device. More specifically, the photographs may be stored at a resolution that matches that of the display screen of the tablet device, even if the photograph as originally captured (and/or the camera on the mobile phone) has a resolution that exceeds that of the display screen on the tablet device.

In some embodiments, a cognitive analysis (or cognitive analyses) is used to classify content portions, determine correlations between content classifications and user utilization of content portions, and/or select storage schemes for content portions. In addition to the data or data sources described above, the analysis may be based on any appropriate data sources associated with the content, one or more users, and/or computing devices associated with the user(s) (e.g., computing devices utilized by the user(s) in conjunction with the content). The data sources may include any appropriate data sources that are accessible by the system (perhaps with the permission or authorization of the user(s)). Examples of data sources associated with users include, but are not limited to, a profile of (or basic information about) the user (e.g., job title, place of work, length of time at current position, family role, etc.), a schedule or calendar (i.e., the items listed thereon, time frames, etc.), projects (e.g., past, current, or future work-related projects), electronic communications (e.g., email, text messages, etc.), social media activity (e.g., posts, reactions, comments, groups, etc.), browsing history (e.g., web pages visited), and online purchases. In some embodiments, user preferences (or settings), such as those associated with the rendering of content on computing devices, may (also) be utilized.

The cognitive analysis may include classifying natural language, analyzing tone, and analyzing sentiment (e.g., scanning for keywords, key phrases, etc.) with respect to, for example, the data sources associated with the user(s) and/or content portions. Over time, the methods and systems described herein may determine correlations (or insights) that allow for an improvement in the optimization of storage schemes for content portions, perhaps with feedback provided by the users, allowing for the performance of the system to improve with continued use.

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, the selecting of storage schemes for content portions by or on computing devices or nodes. Utilizing the models, the performance (or operation) of the system (e.g., utilizing/based on new inputs) may be predicted and/or the performance of the system may be optimized by investigating how changes in the input(s) effect the output(s).

It should be understood that as used herein, the term "computing node" (or simply "node") may refer to a computing device, such as a mobile electronic device or a desktop computer, and/or an application, such an image or video viewer, audio player, social media application, a web browser, etc. In other words, as used herein, examples of computing nodes include, for example, computing devices such as mobile phones, tablet devices, desktop computers, or workstations that are owned and/or otherwise associated with individuals (or users), and/or various applications that are utilized by the individuals on such computing devices.

In some embodiments, the systems (and/or methods) described herein classify content (or content portions, media, etc., such as images, videos, and/or audio files) that is received by, detected on, and/or captured by a first computing device (e.g., a mobile electronic device). The usage of the content (e.g., multiple pieces of content) is monitored (e.g., over time), including the viewing/rendering of the content on (and/or sharing/streaming the content to) one or more second (or secondary) computing devices. Correlations between content classifications and content usage are derived or determined. The correlations are used to select a storage scheme for storing (later received/detected) content portions (e.g., adjustments regarding the manner in which the content portions are stored on the first computing device are made with respect to resolution, crop factor, frame rate, bit rate, etc.).

In particular, in some embodiments, a method for managing content, again by one or more processors, is provided. A content portion associated with a user is detected. A storage scheme for the content portion is selected based on at least one data source associated with utilization of previous content portions by the user. The content portion is caused to be stored on a computing device according to the selected storage scheme.

The selected storage scheme may be associated with an amount of storage space on the computing device utilized to store the content portion. The at least one data source associated with the utilization of the previous content portions by the user may include data associated with computing nodes utilized to render the previous content portions.

The selecting of the storage scheme for the content portion may be performed utilizing a cognitive analysis. The content portion may be classified. The selecting of the storage scheme for the content portion may be further based on the classification of the content portion.

The content portion may include at least one of an image file, a video file, and an audio file. The content portion may be captured by the computing device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
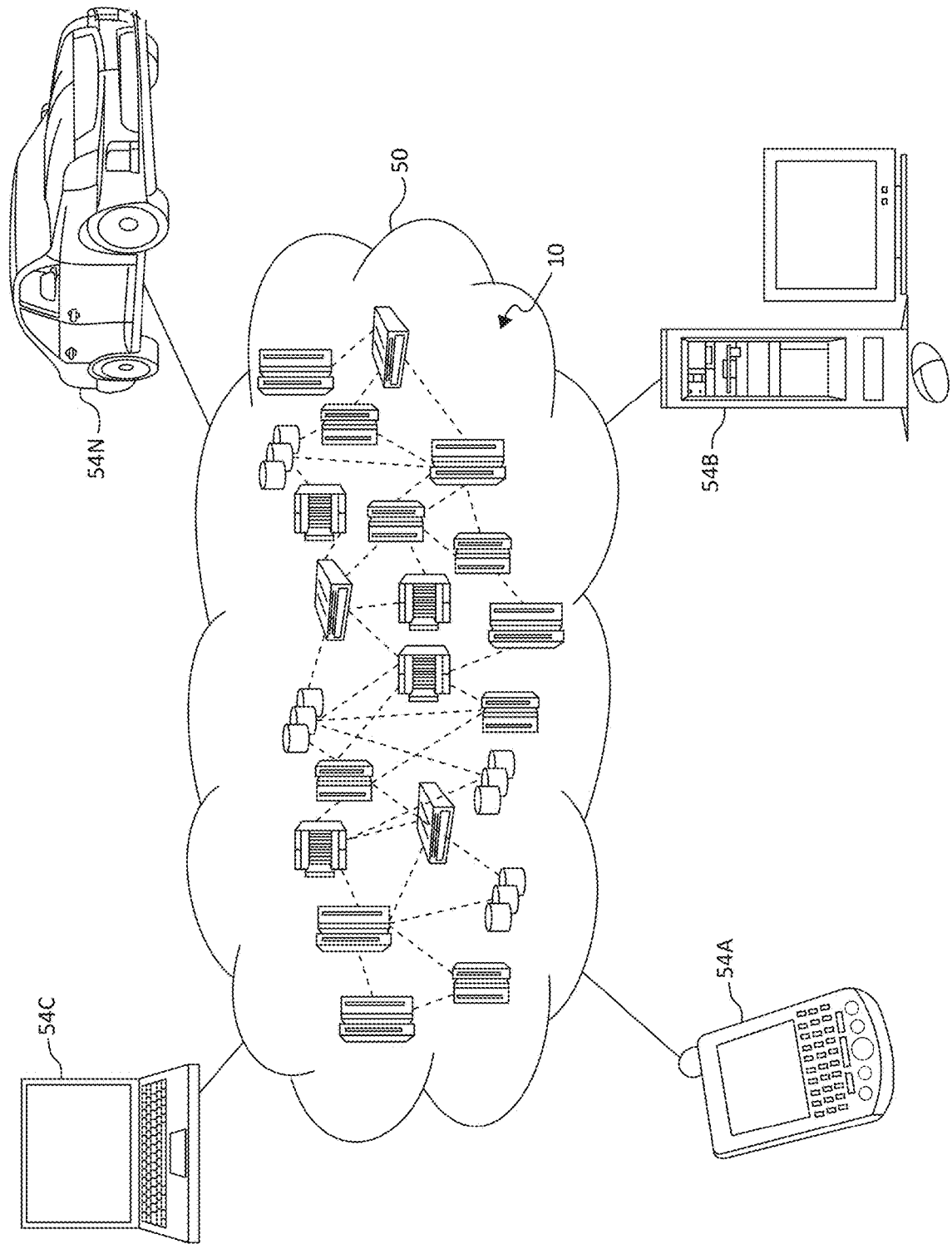
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, laptop computer 54C, and vehicular computing system (e.g., integrated within automobiles, aircraft, watercraft, etc.) 54N, may communicate. Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
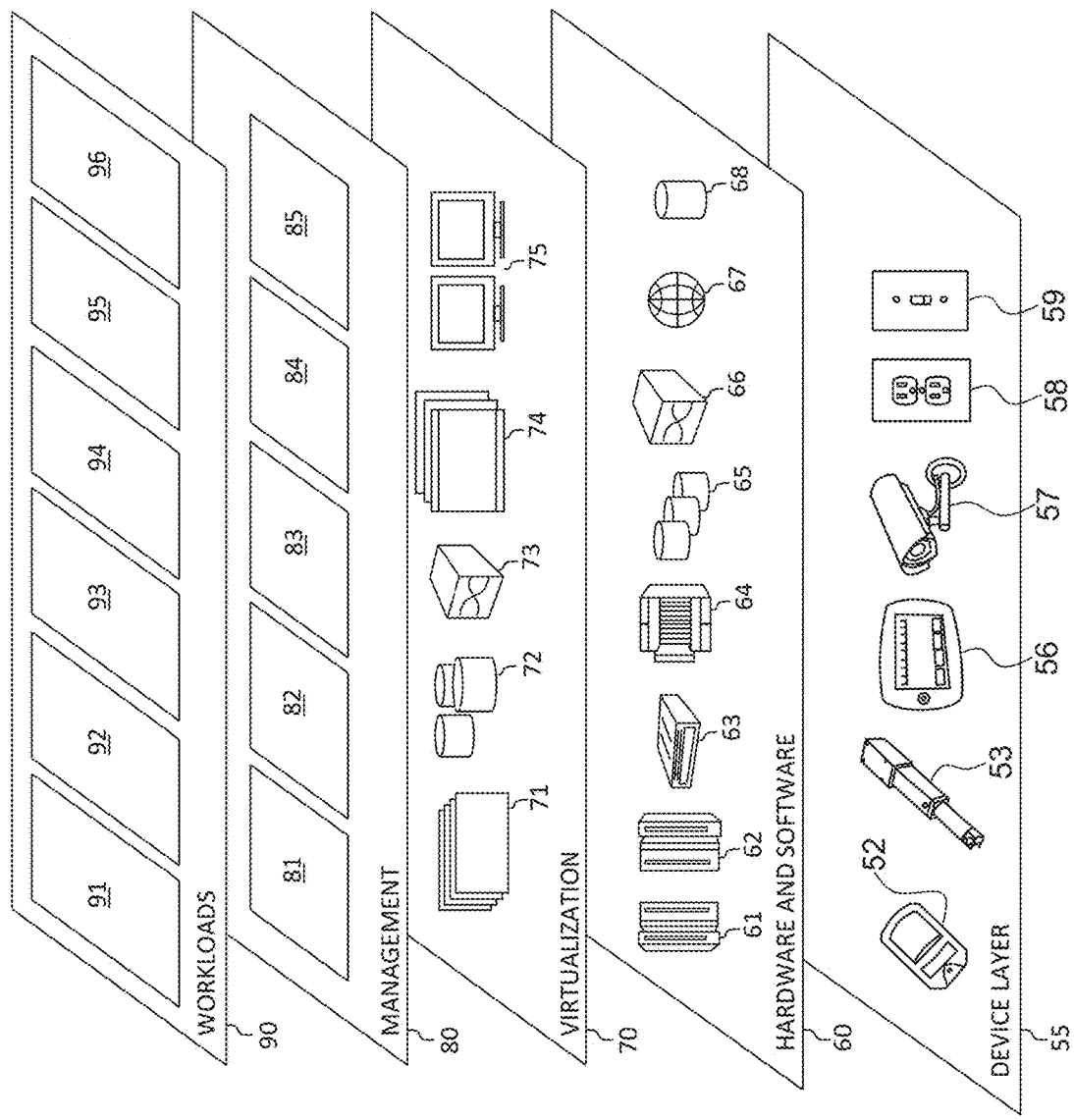
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing content as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, some embodiments described herein provide methods and systems for managing content based on, for example, an understanding (e.g., via a cognitive analysis) of different types of content, potential user devices (or computing nodes) that may be used to consume the content, the user's dynamic preferences (e.g., via an implicit and/or explicit learning/feedback mechanism), and a contextual situation regarding the content and/or the user. Using the methods and systems described herein, content (and/or particular portions or types of content) may be stored on a primary computing device according to a selected storage scheme based on, for example, the content and information related to the secondary computing device(s) typically utilized by the user to render the content.

More specifically, in some embodiments, the methods and/or systems described herein learn (e.g., over time) how a user shares and uses media (or content) captured with (or stored on) a computing device (e.g., a mobile device), based upon a cognitive classification of the media. The usage (or utilization) for a particular piece of content (or content portion) is predicted based on the content classification(s) and observed behavior of the user. An optimized version (or copy) of the content is stored based on this prediction.

Figure 4:
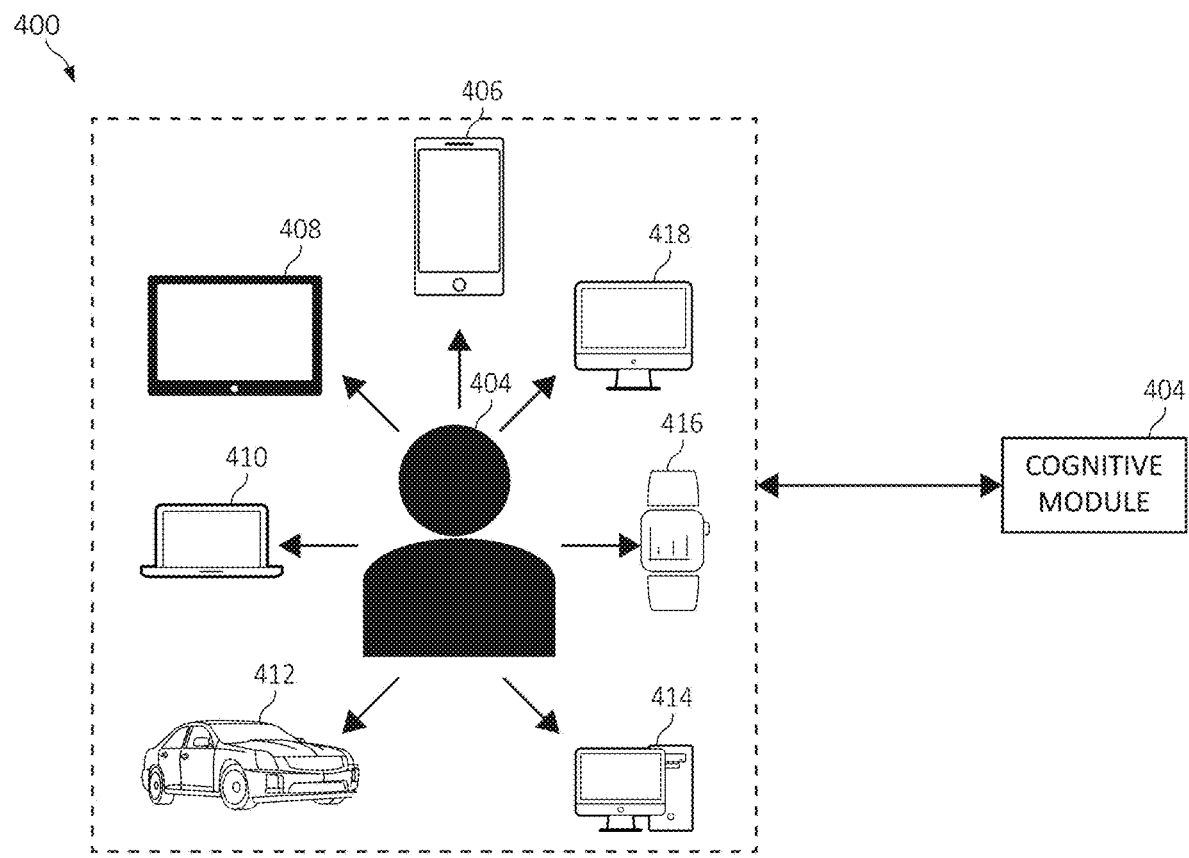
FIG. 4 is a diagram of an exemplary computing environment according to an embodiment of the present invention.

FIG. 4 illustrates an exemplary computing environment (or system) 400 according to some embodiments of the present invention. The computing environment 400 includes a cognitive module (or control system) 402 and a plurality of computing devices (or nodes) that are associated with (e.g., used by, registered to, etc.) a user (or users) 404. In the example shown, the computing devices include a mobile phone 406, a tablet device 408, a desktop computer 410, an automotive (or vehicular) computing system 412, a desktop computer (or PC) 414, a wearable device (e.g., a smart watch) 416, and a television (e.g., a smart television) 406.

The cognitive module 402 may be implemented within any suitable computing device, such as those described above, and may be configured to perform at least some of the functionality described herein. For example, in some embodiments, the cognitive module 402 may monitor the utilization and/or operation of the computing devices 406-418 (e.g., by the user 404). More specifically, the cognitive module 402 may monitor various types of content sent to and/or rendered by the computing devices 406-418, the user's 404 consumption of and/or interaction with the content, the distribution of the content (or content portions) to devices 406-418, and/or any relevant information (e.g., performance specifications) associated with the devices 406-418, as described herein.

Figure 5:
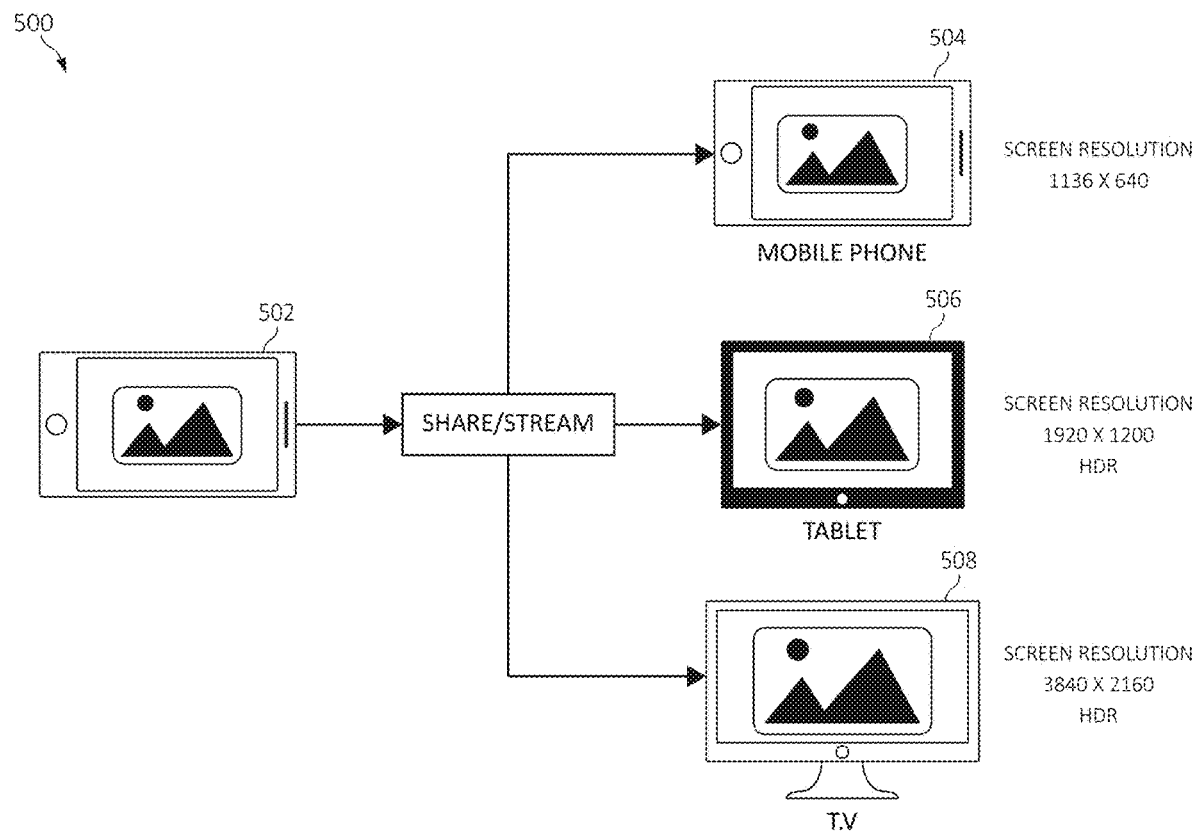
FIG. 5 is a diagram of an exemplary computing environment according to an embodiment of the present invention.

FIG. 5 illustrates an exemplary computing environment (or system) 500 according to some embodiments described herein. The computing environment 500 may include and/or utilize at least some of the computing devices within the computing environment 400 shown in FIG. 4. In particular, as shown in FIG. 5, the environment includes a first (or primary) computing device 502 and other (or secondary) computing devices 504, 506, and 508. In the example shown, the primary computing device 502 is a mobile phone, secondary computing device 504 is a mobile phone (e.g., the same phone as device 502 or a different phone), secondary computing device 506 is a tablet device, and secondary computing device 508 is a television (or smart television). The primary device 502 may include a camera that is capably of capturing high resolution photographs (e.g., 4032×2268 pixels). Secondary device 504 (or perhaps a display screen of primary device 502) may have a screen resolution of 1136×640 pixels, while secondary devices 506 and 508 may have screen resolutions of 1920×1200 pixels and 3840×2140 pixels, respectively.

Still referring to FIG. 5, a photograph (e.g., 4032×2268 pixels) may be captured by the primary device 502 (and/or a camera thereon), or such an image file may otherwise be transferred to the primary device 502 (e.g., downloaded from an online source, received as an attached to an email, etc.). The user may utilize the photograph in various ways with respect to secondary devices 504-508. More specifically, the user may utilize one or more of the secondary devices 504-508 to render or view the photograph (e.g., via sharing, streaming, etc. through wireless communications). Such a process may be repeatedly performed by the user (e.g., multiple photographs or other types of content).

The systems (and/or methods) described herein may monitor and/or track such activity, along with the relevant technical specifications of the various devices, to select a storage scheme for the photograph on the primary device 502. For example, if over time, the system learns that the user typically utilizes secondary device 506 to render/view the photographs (or at least particular types/classifications of photographs), because secondary device 506 has a screen resolution of 1920×1200, the photograph may be stored (or saved) on the primary device 502 at a resolution (e.g., 1920×1200) lower than that of photograph as originally captured or received (e.g., 4032×2268). In this manner, the storage of the photograph on the primary device 502 may be optimized. That is, the photograph may be stored in such a manner such that the storage space utilized is not unnecessarily large or excessive given the user's predicted utilization of the photograph.

If the system determines that the user is likely to render the photograph on more than one of the secondary devices 504-508, the photograph (or other type of content) may be stored in a manner suitable for the device with the "best" performance characteristics. For example, if the user is predicted to utilize secondary devices 506 and 508 to render the photograph, the photograph may be stored at the resolution of secondary device 508 rather than that of secondary device 506 (i.e., 3840×2160 instead of 1920×1200). In some embodiments, the photograph (or other type of content) may also be stored (or backed up) on another computing device or system, such as a remote (or cloud) database, perhaps at "full size" (e.g., at a resolution of 4032×2268).

Still referring to FIG. 5, as alluded to above, secondary computing device 504 may be the same device as and/or be integral with the primary device 502. For example, secondary device 504 may correspond to the display screen (or some other component, such as a microphone or processor) of the primary device 502. That is, the user may utilize the display screen of the primary device 502 to view the photograph. If the system determines that the user is likely to only view the photograph in this manner, the photograph may be stored on the primary device in an appropriate manner (e.g., at a resolution of 1136×640).

In some embodiments, the system classifies content stored and/or detected on a (first or primary) computing device. The computing device may include a computing device that is used to capture or record the content, such as a mobile phone (and/or a camera and/or microphone thereon). The content may include images, video, and/or audio files. The system may utilize a cognitive analysis to analyze and/or classify the content as the content is captured by the device and/or after the content is detected as being stored on the device. In some embodiments, visual recognition and/or natural language processing (NLP) is used to classify the content. The visual recognition (or a visual recognition module) may tag and/or classify the visual content (or visual aspects of the content) using machine learning techniques. Such a process may identify, for example, objects, people, and/or locations that appear in the content. NLP (or a NLP module) may classify any text that appears in images, transcribed audio, captions, and/or tags that are applied to the content.

Figure 6:
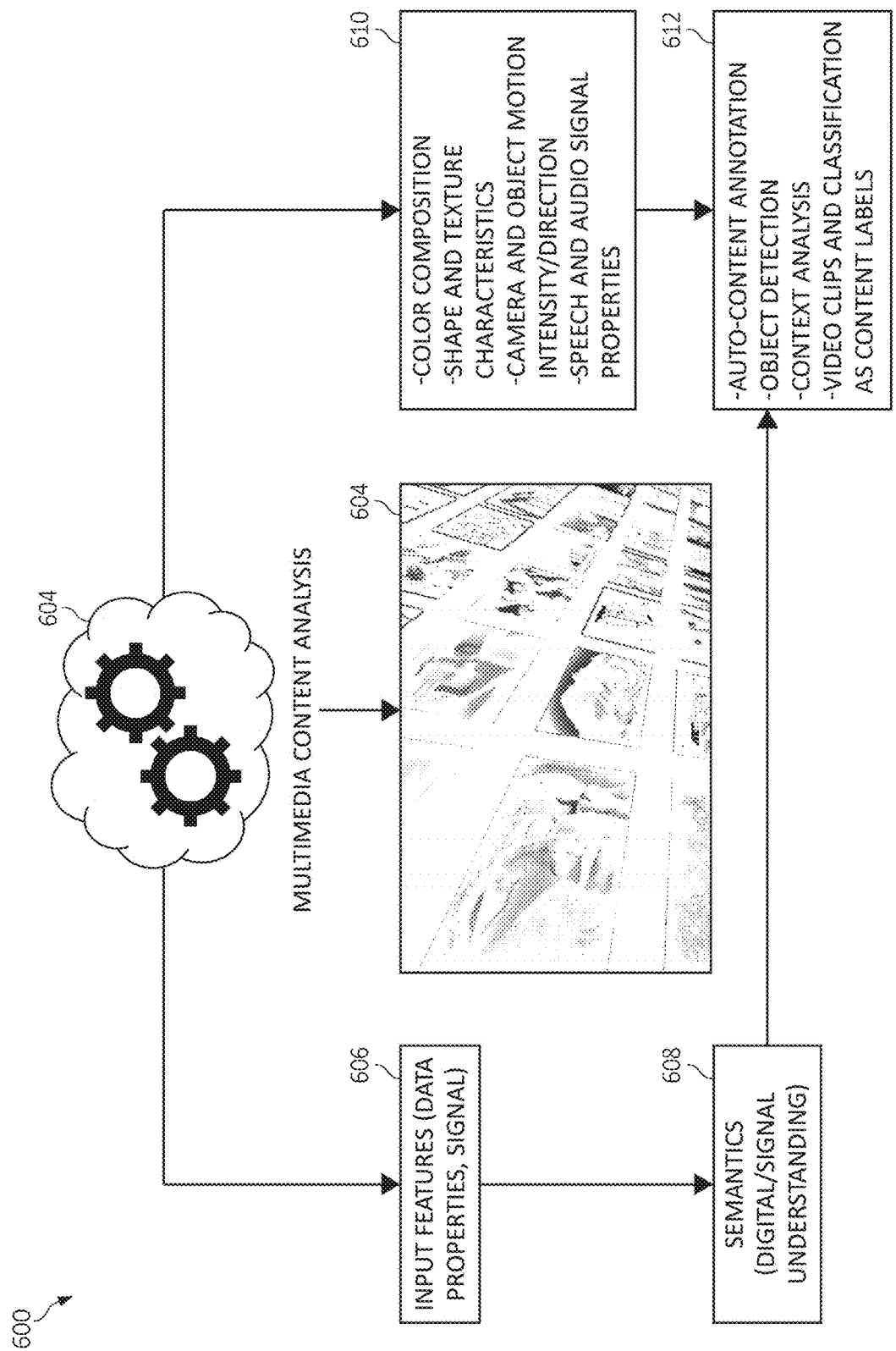
FIG. 6 is a flow chart/block diagram of a method and/or system for analyzing content according to an embodiment of the present invention.

FIG. 6 illustrates a method (and/or system) 600 analyzing (and/or classifying) content according to some embodiments of the present invention. In particular, the method 600 may be used to perform a semantic knowledge extraction process on content (e.g., images, videos, and/or audio files) 602 via cognitive analysis or module 604. At block 606, input features, such as data properties and/or signal properties, are received or extracted from the content. At block 608, a semantic analysis is performed, including, for example, data and/or signal processing. At block 610, various aspects of the content are identified, such as color composition, shape and texture characteristics, camera and/or object motion/intensity/direction, and speech and/or audio signal properties, depending on the type of content being processes (e.g., images, video, and/or audio). At block 612, again depending on the type of content, various other functions are performed, such as (automatic) content annotation, object detection, content mining, context (or contextual) analysis, and classification via content labels (e.g., metadata or tags for video clips, images, etc.).

Figure 7:
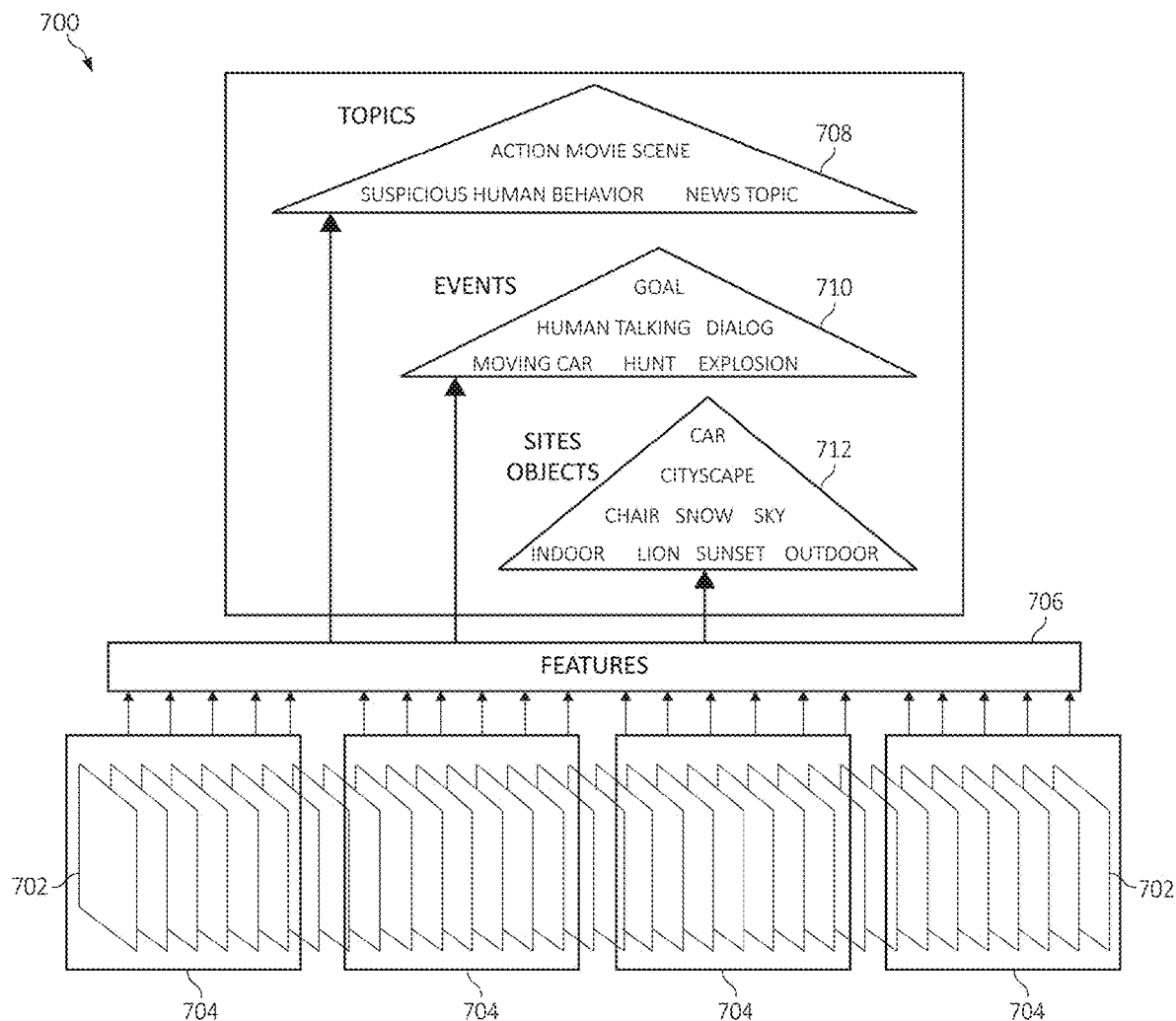
FIG. 7 is a diagram of a method for extracting features and/or content from a video according to an embodiment of the present invention.

In some embodiments, the system analyzes all types of data that can be extracted from and/or is associated with the content, such as image frames, sound/audio tracks, texts that can be extracted from image frames, and spoken words that can be deciphered from the audio track. This may involve segmenting the document (or content) into semantically meaningful units, classifying each unit into a predefined scene type, and indexing and summarizing the document for efficient retrieval and browsing. FIG. 7 illustrates a method 700 for extracting features and/or content from a video (or video frames) according to an embodiment of the present invention. In the example shown, each frame 702 in the buffer (F) 704 (e.g., except the first frame (F0)), is processed by a region-based convolutional neural network (R-CNN) 706 to classify the images. The extracted information (or input features) is sub-classified or categorized into various groups. In the depicted embodiment, the groups include topics 708 (e.g., action movie scene, suspicious human behavior, and news topic), events 710 (e.g., goal, human-talking/dialog, moving car, hunt, and explosion), and sites and objects 712 (e.g., car, cityscape, chair, snow, sky, indoor, lion, sunset, and outdoor).

Figure 8:
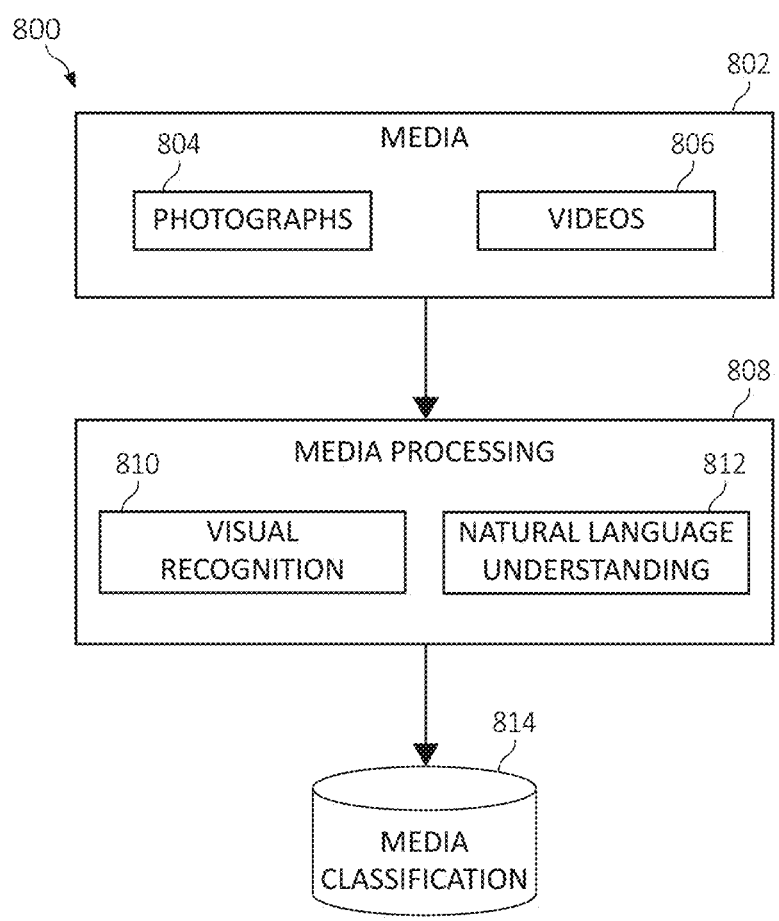
FIG. 8 is a flow chart/block diagram of a method and/or system for processing and storing content classifications according to an embodiment of the present invention.

FIG. 8 illustrates a method (and/or system) 800 for processing and/or classifying and storing media (or content) classifications according to an embodiment of the present invention. In the depicted embodiment, media is stored on and/or captured by a mobile device (e.g., a mobile phone) 802 (or other suitable computing device). The media may include, for example, photographs 804 and videos (or video files) 806. The media is sent to (and/or received by) a media processing (or classification) module 808, which performs visual recognition 810 and natural language processing (NLP) 812 on the media to classify the media, as described above. The media processing module 808 may be implemented on any suitable computing device, such the mobile device 802 and/or a remote server. Derived classifications for the media are sent to and/or stored on a database 814 (e.g., on a local device and/or a remote database). The media classifications may be accessed by the system and utilized as described herein.

In some embodiments, the system monitors the user's (or users') utilization of content or media (e.g., content/media stored on and/or captured by a primary computing device). In particular, the system may monitor (and/or track/store) how the content is used, rendered, and/or shared. Aspects of content utilization may include, for example, the following: whether or not the content (and/or the extent to which) the content is rendered on (or by) the primary computing device (e.g., a mobile device); whether or not the user crops and/or zooms the content (e.g., images or photographs) on the primary device; whether or not the user sends the content to other computing nodes and/or devices (e.g., sharing to a social media platform, sending/streaming to and/or rendering on other computing devices, etc.). The content utilization data may be stored on, for example, the same memory or database as the content/media classifications or another memory/database (e.g., local or remote).

In some embodiments, the system derives insights or correlations between the content (or media) classifications and the content utilization. The deriving of correlations may be performed utilizing a cognitive analysis. In particular, the system may derive correlations between how particular content is classified and how that content is utilized, thus generating generalized observations regarding how particular classifications of content are utilized. A confidence level (or score or grade) may be assigned to (and/or calculated or determined for) each correlation (or insight) based on, for example, the quality of classifications and frequency of occurrence (e.g., of the observed utilization of particular classifications). Exemplary correlations may include the following: images featuring landscapes are frequently cropped by 20-30% (76% confidence level); videos of a user's child are frequently streamed at high resolution (e.g., "4K") to a TV (56% confidence level); "selfie" photographs are frequently shared to social media platforms (or networks) (91% confidence level).

The storage of captured (or detected or received) content (e.g., content stored on and/or captured by a primary computing device) is optimized based on the correlations described above, perhaps along with information related to other computing devices (e.g., performance specifications of secondary computing devices utilized by the user). For example, the system may optimize the storage of content captured by a mobile phone (e.g., images or videos) based on the derived correlations that indicate the user's likely utilization of the content. In some embodiments, the correlations that are utilized include (only) those with a confidence level above a predetermined threshold (which may be configurable). Aspects (or characteristics) of the content that may be adjusted (e.g., "reduced") to optimize the storage thereof include, for example, image/video resolution, crop factor, frame rate, bit rate, and dynamic range (i.e., depending on if the content includes images, videos, and/or audio).

In some embodiments, the system continues to monitor/track the utilization of content. If the system detects that the actual utilization (or use) of content is different than the predicted utilization (e.g., based on the correlations), the system may retrieve a full size version or copy of the content (e.g., from a cloud database) and restore it on the primary device. The confidence level(s) associated with the content (and/or the classification(s) thereof) may be updated and/or adjusted. Additionally, user feedback (e.g., explicit feedback generated by the user and/or monitoring the user's behavior/reactions) may also be utilized.

In some embodiments, a deep (or deep stack) neural network is utilized (e.g., to perform the functionality described with respect to FIGS. 6 and 7), which takes into account the input features described above with reconfigurable weights. The output derived from the neural network determines the optimization of the local storage (or storage scheme) of the content based upon the derived expected (or predicted) usage of the content. It may be beneficial if the learning mechanism is able to not only capture (or derive) correlations across several different feature vectors (e.g., created from user activity logs, user profiles, content utilization, etc.) but also to capture time dependences across several days for appropriate distribution.

Figure 9:
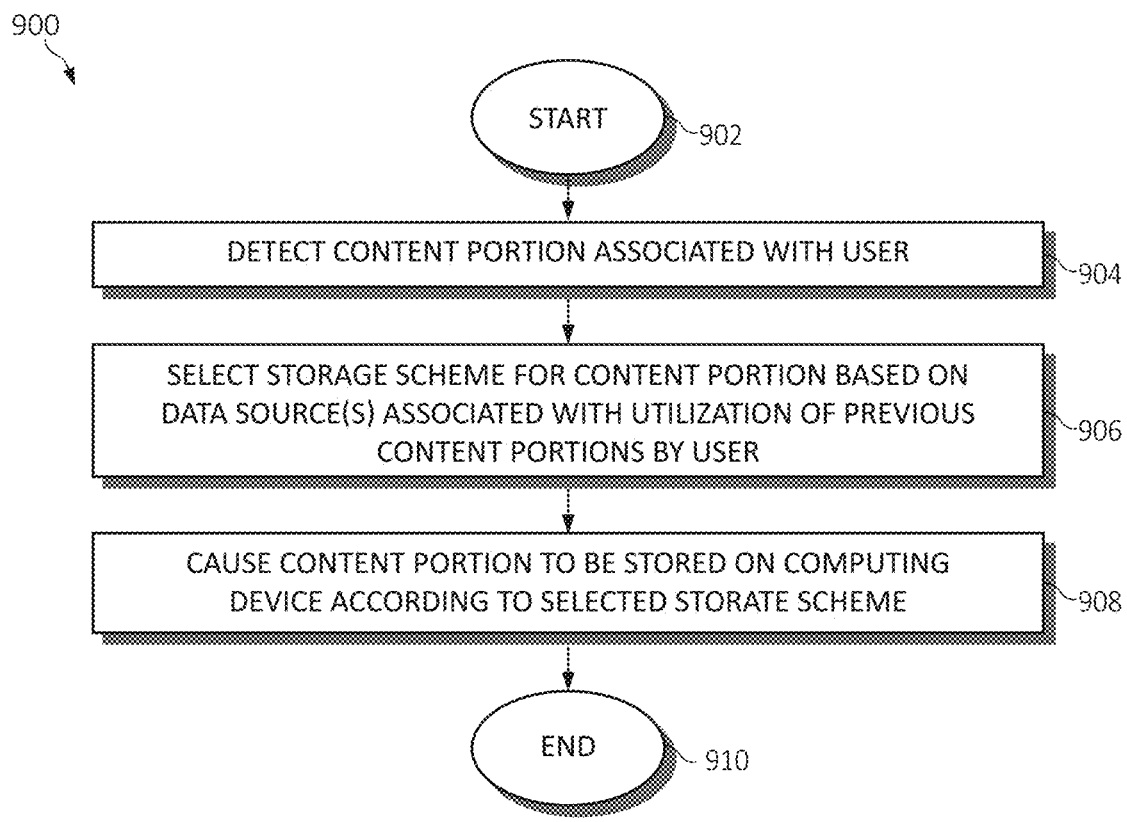
FIG. 9 is a flowchart diagram of an exemplary method for managing content according to an embodiment of the present invention.

Turning to FIG. 9, a flowchart diagram of an exemplary method 900 for managing content (or the storage thereof), in accordance with various aspects of the present invention, is provided. Method 900 begins (step 902) with, for example, a user (or users) utilizing various types of content with one or more computing devices (e.g., rendering the content on particular devices, sending the content to other computing devices, etc.). The user's utilization of the content may be monitored and/or tracked, as described above.

A content portion associated with a user is detected (step 904). For example, a content portion, such as an image/photograph, video file, audio file, etc., may be detected as being captured by and/or otherwise stored on a first (or primary) computing device, such as a mobile device, associated with (e.g., owned by, registered to, used by, etc.) a user (or individual). As one particular example, the content (or content portion) may be captured by a mobile phone (and/or a camera and/or microphone integrated therein).

A storage scheme for the content portion is selected based on at least one data source associated with utilization of previous content portions by the user (step 906). In some embodiments, the storage scheme is selected based on a predicted utilization of the content portion (e.g., based on the utilization of previous content portions). The at least one data source associated with the utilization of previous content portions may include data related to the utilization of the previous content on other (or secondary) computing nodes/devices (e.g., sending/sharing the content to computing devices besides the primary device and/or otherwise rendering the content on other computing devices). The at least one data source associated with the utilization of the previous content portions by the user may (also) include data associated with the (other/secondary) computing nodes utilized to render the previous content portions (e.g., technical details, performance specifications, etc. of the other computing nodes/devices). The selecting of the storage scheme for the content portion may be performed utilizing a cognitive analysis. The content portion may be classified, and the selecting of the storage scheme for the content portion may be further based on the classification of the content portion.

The content portion is caused to be stored on a computing device according to the selected storage scheme (step 908). The selected storage scheme may be associated with an amount of storage space on the computing device utilized to store the content portion (e.g., the resolution, frame rate, bit rate, etc. at which the content is stored, depending on the type of content). The causing of the content portion to be stored according to the selected storage scheme may include adjusting the manner in which the content is already stored (e.g., when the computing device on which the content portion is stored was used to capture and/or previous store the content portion) or causing the content portion to be initially stored in such a manner.

Method 900 ends (step 910) with, for example, the utilization of the content portion stored according to the selected storage scheme being monitored or tracked and/or feedback being received from the user. If the actual utilization (or use) of the content portion is different than the predicted utilization and/or the user feedback is negative, the operation of the system may be updated and/or adjusted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing content comprising:
  receiving, by a computing device used by and local to a user, first media data having first characteristics of contextual characteristics inclusive of a type of media, and a resolution and frame rate of the type of media;
  determining that the user chooses to view the first media data exclusively on the computing device, instead of one or more additional computing devices locally available to the user, due to the first media data containing the first characteristics preferentially viewed by the user on the computing device;
  receiving, by the computing device, second media data having second characteristics of the contextual characteristics different than the first characteristics;
  determining that the user transmits the second media data to a secondary computing device of the one or more additional computing devices;
  determining that the user chooses to view the second media data exclusively on the secondary computing device, instead of the computing device, due to the second media data containing the second characteristics preferentially viewed by the user on the secondary computing device;
  correlating that the user views the first media data on the computing device because the first media data includes the first characteristics, and views the second media data on the secondary computing device because the second media data includes the second characteristics, wherein the correlation is stored on at least one data source;
  commensurate with performing the correlation, classifying content portions in each of the first media data and the second media data based on the contextual characteristics identified within the content portions, wherein the contextual characteristics further include identified persons, places, objects, sounds, and utterances within the content portions, modifications made to the media data and an application rendering the media data by the user while consuming the content portions, a color composition, shape, and texture characteristics of the content portions, audio signal properties of the content portions, and a type of the various forms of media data making up the content portions;
  detecting third media data having a new content portion is received by the computing device;
  identifying the contextual characteristics within the new content portion;
  selecting a storage scheme for the new content portion according to a predicted utilization of the new content by the user based on the correlation in the at least one data source associated with the consumption of the content portions by the user, wherein the correlation has a confidence level that exceeds a predetermined threshold, wherein at least a first storage scheme comprises storing, on the computing device, a reduced-size version of the new content portion according to content optimization settings of the computing device, and wherein the storage scheme is further selected according to technical specifications of the secondary computing device utilized to render the content portions such that the new content portion is stored on the computing device irrespective of whether technical characteristics of the new content portion, as stored based on the storage scheme, exceed technical specifications of the computing device yet align with the technical specifications of the secondary computing device;

causing the new content portion to be stored on the computing device according to the selected storage scheme; and responsive to detecting that actual utilization of the new content differs from the predicted utilization, restoring a full size version of the new content on the computing device.

2. The method of claim 1, wherein the selected storage scheme is associated with an amount of storage space on the computing device utilized to store the new content portion.

3. The method of claim 1, wherein the selecting of the storage scheme for the new content portion is performed utilizing a cognitive analysis.

4. The method of claim 1, further comprising classifying the new content portion, and wherein the selecting of the storage scheme for the new content portion is further based on said classification of the new content portion.

5. The method of claim 1, wherein the new content portion includes at least one of an image file, a video file, and an audio file.

6. The method of claim 1, wherein the new content portion is captured by the computing device.

7. The method of claim 1, adjusting the confidence level of the correlation response to detecting that the actual utilization of the new content differs from the predicted utilization.

8. A system for managing content comprising:
at least one processor that
receives, by a computing device used by and local to a user, first media data having first characteristics of contextual characteristics inclusive of a type of media, and a resolution and frame rate of the type of media;

determines that the user chooses to view the first media data exclusively on the computing device, instead of one or more additional computing devices locally available to the user, due to the first media data containing the first characteristics preferentially viewed by the user on the computing device;

receives, by the computing device, second media data having second characteristics of the contextual characteristics different than the first characteristics;

determines that the user transmits the second media data to a secondary computing device of the one or more additional computing devices;

determines that the user chooses to view the second media data exclusively on the secondary computing device, instead of the computing device, due to the second media data containing the second characteristics preferentially viewed by the user on the secondary computing device;

correlates that the user views the first media data on the computing device because the first media data includes the first characteristics, and views the second media data on the secondary computing device because the second media data includes the second characteristics, wherein the correlation is stored on at least one data source;

commensurate with performing the correlating, classifies content portions in each of the first media data and the second media data based on the contextual characteristics identified within the content portions, wherein the contextual characteristics include identified persons, places, objects, sounds, and utterances within the content portions, modifications made to the media data and an application rendering the media data by the user while consuming the content portions, a color composition, shape, and texture characteristics of the content portions, audio signal properties of the content portions, and a type of the various forms of media data making up the content portions;

detects third media data having a new content portion is received by the computing device;

identifies the contextual characteristics within the new content portion;

selects a storage scheme for the new content portion according to a predicted utilization of the new content by the user based on the correlation in the at least one data source associated with the consumption of the content portions by the user, wherein the correlation has a confidence level that exceeds a predetermined threshold, wherein at least a first storage scheme comprises storing, on the computing device, a reduced-size version of the new content portion according to content optimization settings of the computing device, and wherein the storage scheme is further selected according to technical specifications of the secondary computing device utilized to render the content portions such that the new content portion is stored on the computing device irrespective of whether technical characteristics of the new content portion, as stored based on the storage scheme, exceed technical specifications of the computing device yet align with the technical specifications of the secondary computing device;

causes the new content portion to be stored on the computing device according to the selected storage scheme; and responsive to detecting that actual utilization of the new content differs from the predicted utilization, restores a full size version of the new content on the computing device.

9. The system of claim 8, wherein the selected storage scheme is associated with an amount of storage space on the computing device utilized to store the new content portion.

10. The system of claim 8, wherein the selecting of the storage scheme for the new content portion is performed utilizing a cognitive analysis.

11. The system of claim 8, wherein the at least one processor further classifies the new content portion, and wherein the selecting of the storage scheme for the new content portion is further based on said classification of the new content portion.

12. The system of claim 8, wherein the new content portion includes at least one of an image file, a video file, and an audio file.

13. The system of claim 8, wherein the new content portion is captured by the computing device.

14. The system of claim 8, wherein the at least one processor further adjusts the confidence level of the correlation response to detecting that the actual utilization of the new content differs from the predicted utilization.

15. A computer program product for managing content by one or more processors, the computer program product comprising a non-transitory computer-readable storage medium having computer-readable program code portions stored therein, the computer-readable program code portions comprising:

an executable portion that receives, by a computing device used by and local to a user, first media data having first characteristics of contextual characteristics inclusive of a type of media, and a resolution and frame rate of the type of media;

an executable portion that determines that the user chooses to view the first media data exclusively on the computing device, instead of one or more additional computing devices locally available to the user, due to the first media data containing the first characteristics preferentially viewed by the user on the computing device;

an executable portion that receives, by the computing device, second media data having second characteristics of the contextual characteristics different than the first characteristics; an executable portion that determines that the user transmits the second media data to a secondary computing device of the one or more additional computing devices;

an executable portion that determines that the user chooses to view the second media data exclusively on the secondary computing device, instead of the computing device, due to the second media data containing the second characteristics preferentially viewed by the user on the secondary computing device;

an executable portion that correlates that the user views the first media data on the computing device because the first media data includes the first characteristics, and views the second media data on the secondary computing device because the second media data includes the second characteristics, wherein the correlation is stored on at least one data source;

an executable portion that, commensurate with performing the correlating, classifies content portions in each of the first media data and the second media data based on the contextual characteristics identified within the content portions, wherein the contextual characteristics include identified persons, places, objects, sounds, and utterances within the content portions, modifications made to the media data and an application rendering the media data by the user while consuming the content portions, a color composition, shape, and texture characteristics of the content portions, audio signal properties of the content portions, and a type of the various forms of media data making up the content portions;

an executable portion that detects third media data having a new content portion is received by the computing device;

an executable portion that identifies the contextual characteristics within the new content portion;

an executable portion that selects a storage scheme for the new content portion according to a predicted utilization of the new content by the user based on the correlation in the at least one data source associated with the consumption of the content portions by the user, wherein the correlation has a confidence level that exceeds a predetermined threshold, wherein at least a first storage scheme comprises storing, on the computing device, a reduced-size version of the new content portion according to content optimization settings of the computing device, and wherein the storage scheme is further selected according to technical specifications of the secondary computing device utilized to render the content portions such that the new content portion is stored on the computing device irrespective of whether technical characteristics of the new content portion, as stored based on the storage scheme, exceed technical specifications of the computing device yet align with the technical specifications of the secondary computing device;

an executable portion that causes the new content portion to be stored on the computing device according to the selected storage scheme; and an executable portion that, responsive to detecting that actual utilization of the new content differs from the predicted utilization, restores a full size version of the new content on the computing device.

16. The computer program product of claim 15, wherein the selected storage scheme is associated with an amount of storage space on the computing device utilized to store the new content portion.

17. The computer program product of claim 15, wherein the selecting of the storage scheme for the new content portion is performed utilizing a cognitive analysis.

18. The computer program product of claim 15, wherein the computer-readable program code portions further include an executable portion that classifies the new content portion, and wherein the selecting of the storage scheme for the new content portion is further based on said classification of the new content portion.

19. The computer program product of claim 15, wherein the new content portion includes at least one of an image file, a video file, and an audio file.

20. The computer program product of claim 15, wherein the new content portion is captured by the computing device.

21. The computer program product of claim 15, further comprising an executable portion that adjusts the confidence level of the correlation response to detecting that the actual utilization of the new content differs from the predicted utilization.

* * * * *